(No Model.)
I. L. GARSIDE.
SIGNAL BELL.
No. 531,373. Patented Dec. 25, 1894.
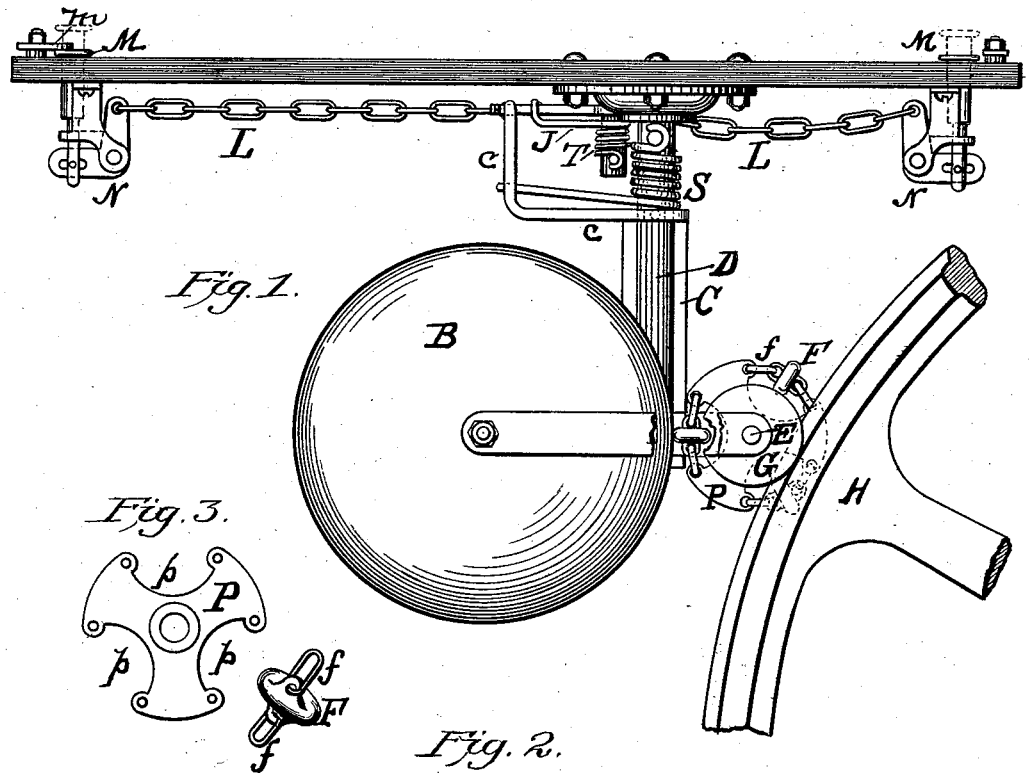
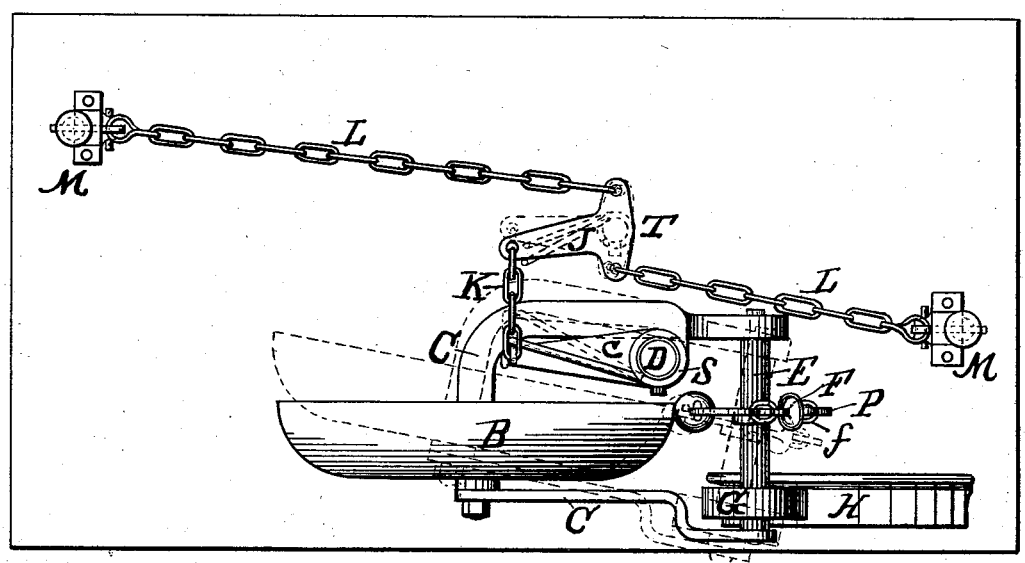
Witnesses
Geo. H. Sonneborn,
Henry E. Everding
Inventor
Irad L. Garside
by Harold Binney
Atty.

UNITED STATES PATENT OFFICE.

IRAD L. GARSIDE, OF PATERSON, NEW JERSEY, ASSIGNOR TO THE MULTI-STROKE BELL COMPANY, OF NEW JERSEY.

SIGNAL-BELL.

SPECIFICATION forming part of Letters Patent No. 531,373, dated December 25, 1894.

Application filed May 15, 1894. Serial No. 511,294. (No model.)

*To all whom it may concern:*

Be it known that I, IRAD L. GARSIDE, of the city of Paterson, State of New Jersey, have invented a new and useful Improvement in Bells, of which the following is a description, referring to the accompanying drawings, which form a part of this specification.

My invention relates particularly to signal and alarm bells, used upon vehicles to warn persons ahead to make room for the passage of such vehicles, as for instance street cars and patrols; but in many of its features my improvement is applicable to all forms of call and signal bells.

The purpose of this invention is to increase the effect, the ease of manipulation, and the durability of such bells, while decreasing their initial cost and the cost of repairs and renewals.

My improved bell is operated by a friction roller bearing on the tread of one of the wheels of the vehicle for which it is designed. The rotation of this friction wheel rotates the strikers of the bell with more or less force and consequent noise, according to the speed of the vehicle. When not required, the bell is held inoperative by means of a spring which holds the friction roller out of contact with the wheel of the vehicle. Suitable chain connections lead to pedals or other devices for controlling the bell, and by the depression of the pedal (or proper movement of the equivalent controlling device) the pressure of the restraining spring is removed and the friction roller is then forced by a second spring into contact with the revolving wheel of the vehicle, causing the alarm to sound. If desired the pedals may be held down by a suitable stop or catch, causing the bell to sound continuously while the vehicle is in motion. As this form of friction-roller bell receives its power from the wheel of the vehicle, it is both desirable and necessary that the operation of the strikers or bell hammers may be at once smooth and durable. To this end I have devised a system of suspended strikers, each striker consisting of a rounded or ellipsoidal metallic bead or button suspended at either side by one or more links to the rotary carrier or support. This carrier preferably forms a plate mounted directly upon and turning with the shaft of the friction roller. By this construction great simplicity and smoothness of action are attained.

Such briefly is a general description of my invention. In the accompanying drawings I have illustrated it in one of its most preferred embodiments as designed for street car use; and from the detailed description of this form of the improvement, its minor features and many incidental purposes, will be more clearly understood.

Figure 1 is an elevation of the bell as mounted upon a horizontal board corresponding with and showing its manner of operation upon a car, one wheel of the vehicle being shown broken away. Fig. 2 is a plan view of the same. Fig. 3 is a detail view of the striker support and one striker.

Throughout the figures like letters of reference indicate like parts.

The bell or gong is shown at B, mounted in the pivoted frame C, which is carried by and turns upon the pin or stud-shaft D. The frame C is preferably formed in two pieces secured together by a single screw or other device which passes through the center of the bell, holding that also in place. The frame C forms the bearings for the knocker or striker shaft E carrying the knockers, hammers, or strikers, of any desired form F, and the friction roller G. The frame C is provided with an arm *c* and spring S which forces the roller G against the tread of the vehicle wheel H and thereby causes the wheel H to drive the roller G and operate the strikers. Normally however the spring S is not allowed to act, but is restrained and the roller G withdrawn, by a second spring T actuating the double-armed or T-shaped bell crank J connected by a chain K, or other connection, with the arm *c*. The force of the spring T normally overcomes the force of the spring S, holding the friction roller out of contact. To the short arms *t*, respectively, are secured the ends of two controlling or operating chains L, running to the two pedals M. These pedals, for use on a street car, will be placed upon each platform, the chains L connecting with the cranks J at or near the center of the car, and the chain K being of length and running in suitable direction to the bell at the side of the car by one of the wheels H. The pedals M may be connected with the chains by the bell crank levers N, or in any suitable manner, so that the depression of the pedals will draw upon the chains. When therefore the pedals are depressed, the chains L turn the cranks J relieving the force of the spring T and permitting the spring S to act. This spring S, which I may very properly call my contact spring, forces the friction wheel into contact with the wheel H, and actuates the bell. If desired a stop m, (Fig. 1) may be employed to permanently depress the pedal M and thereby keep the bell in continuous vibration, as for instance in crowded thoroughfares.

The purpose of the chain connections and double spring action is to permit the friction roller to act under light spring contact, for if positively operated, say by the force of the pressure on the pedal, the bearings are quickly ground away and a rough uneven action of the bell caused. The spring contact allows the roller G to follow all the movements of the tread of the wheel H, giving a smooth and even operation not otherwise attained.

To make my bell doubly effective for the service required of it, I have designed the strikers, as already briefly described. The form and the mounting, of these, are shown clearly in Fig. 3. The strikers or knockers F are preferably of approximately the shape shown in the figure. A carrier or support plate P, of circular or other convenient design, is recessed at two, three or more points p, of its periphery, and in these recesses the strikers F are mounted, by means of the links f, which suspend the strikers from each side and permit the freest possible play.

I am aware that pivoted or swinging strikers are very old and well known, but I believe I am the first to employ strikers mounted on a rotating plate by means of links or chains from each side of the strikers. The absolute freedom of this manner of mounting makes this form of striker peculiarly advantageous for all types of multi-stroke bells.

I have now set forth my invention in one of its preferred forms and explained the manner in which it may be put into use. I have purposely omitted the enumeration of the many advantages of the two sets of chain connections lengthwise and across the car and of the other features of my device, as well as the many modifications that may be made by mere skill in the art; because to set forth all these matters at length would obscure rather than make clear the more essential features of the invention.

I claim, however, and desire to secure by these Letters Patent, together with all such modifications, and with only the limitations as expressed or implied, the following:

1. In combination with a bell or gong operated by a contact or friction roller, a spring acting to cause the said roller to make yielding contact with the tire or wheel, a spring actuated connection for withdrawing the said roller against the action of the said spring, a second spring for actuating the said connection, and means for counteracting the effect of the said second spring whereby the said roller may be freely forced into contact by the action of the first said spring, substantially as and for the purposes set forth.

2. In combination, a friction-roller bell and mechanism, pivotally mounted, a spring for turning the bell upon its pivotal mounting and causing the friction roller to make contact with the tire or wheel, a chain or flexible connection for withdrawing the bell out of operation and against the force of the said spring, a pivoted spring-actuated crank or lever for such chain or flexible connection, and means for counteracting or restraining the action of the said spring-actuated crank, at will, whereby the bell may be brought into action, substantially as and for the purposes set forth.

3. In combination in a bell ringing mechanism, the bell or gong and its frame or support C, a shaft mounted and turning in the said frame, a friction roller carried on the said shaft, a rotary striker or strikers mounted upon the said shaft, and means for rotating the said frame to cause the said roller to make contact with the wheel for which it is designed, substantially as and for the purposes set forth.

4. In combination in a striker or hammer device for bells, a rotary shaft, a plate or support mounted thereon and one or more strikers, hammers, or knockers, suspended by and between two or more links f, within or upon the said support, substantially as and for the purposes set forth.

5. The herein described improvement in alarm and signal bells, consisting of the strikers, hammers, or knockers, and the link suspension therefor, the said strikers, hammers, or knockers being free to play within a limited space and substantially forming an intermediate link of a chain in connection with and continuation of the said link suspension.

In testimony whereof I have hereunto set my hand, at New York, N. Y., in the presence of the two subscribing witnesses, this 11th day of May, 1894.

IRAD L. GARSIDE.

Witnesses:
GEORGE H. SONNEBORN,
HAROLD BINNEY.